(12) United States Patent
Witt

(10) Patent No.: US 7,835,439 B2
(45) Date of Patent: Nov. 16, 2010

(54) VIDEO COMPRESSION SYSTEM

(75) Inventor: Daniel Witt, Center Moriches, NY (US)

(73) Assignee: VectorMAX Corporation, Farmingdale, NY (US)

(*) Notice: Subject to any disclaimer, the term of this patent is extended or adjusted under 35 U.S.C. 154(b) by 1442 days.

(21) Appl. No.: 11/244,426

(22) Filed: Oct. 5, 2005

(65) Prior Publication Data

US 2007/0044128 A1 Feb. 22, 2007

Related U.S. Application Data

(60) Provisional application No. 60/615,989, filed on Oct. 5, 2004.

(51) Int. Cl.
*H04N 7/12* (2006.01)
*H04N 11/02* (2006.01)
*H04N 11/04* (2006.01)
*G06K 9/36* (2006.01)
*G06K 9/46* (2006.01)

(52) U.S. Cl. ............................ 375/240.13; 375/240.26; 375/240.28; 382/236

(58) Field of Classification Search ................. 375/240.01–240.29; 382/166, 232, 236
See application file for complete search history.

(56) References Cited

U.S. PATENT DOCUMENTS 5,440,346 A * 8/1995 Alattar et al. .......... 375/240.24
5,847,763 A * 12/1998 Matsumura et al. .... 375/240.15
2002/0147980 A1 10/2002 Satada

FOREIGN PATENT DOCUMENTS

| JP | 05252511 A | * | 9/1993 |
| JP | 05328324 A | * | 12/1993 |
| JP | 10-304382 | | 11/1998 |
| WO | WO 2004/049719 A1 | | 6/2004 |

OTHER PUBLICATIONS

Chen et al. ("Downloading and stream conversion: supporting interactive playout of videos in a client station", IEEE Proceedings of the International Conference on Multimedia Computing and Systems, May 15-18, 1995, pp. 73-80).*

Inoue, "Patent Abstracts of Japan", Appln. #: 09118683, Pub. #: 10304382, Pub. date: Nov. 13, 1998, cited in corresponding PCT application.

* cited by examiner

*Primary Examiner*—Yubin Hung
(74) *Attorney, Agent, or Firm*—Jack Schwartz & Associates, PLLC

(57) ABSTRACT

A system involves encoding key frames within a data stream as both key frames and delta frames. A data stream including all encoded key and delta frames is formed and upon receipt of a request signal, the formed data stream is transmitted with the first key frame occurring in the stream after receipt of the request signal and the subsequent delta frames. Key frames are inserted in the transmitted data stream if positioned within the stream immediately after receipt of a signal requesting the data stream.

14 Claims, 4 Drawing Sheets

VIDEO COMPRESSION SYSTEM

CROSS-REFERENCE TO RELATED APPLICATIONS

This is a non-provisional application of U.S. Provisional Application Ser. No. 60/615,989 filed Oct. 5, 2004.

FIELD OF THE INVENTION

The present system relates to encoding video data and, more particularly, to compressing video data to thereby reduce the overall bandwidth used during transmission.

BACKGROUND OF THE INVENTION

A common method of digital video compression is to record the changes between frames. Thus, in a scene where little movement takes place a minimal amount of data is encoded. This is accomplished by encoding key frames and delta frames. A key frame corresponds to a whole frame which the video player can use as a reference and start point. A delta frame corresponds to change between a first frame and a subsequent frame. The decoding of the key frame and subsequent delta frame produces the un-encoded subsequent frame.

Frames are divided into multiple blocks representing regions. In sequential frames these blocks are analyzed for change. If a change exists, the data is encoded. If the data in the region is identical to the preceding frame, the data is redundant and need not be encoded. In this way, a minimal set of data is encoded from one frame to the next.

However, while this compression method was useful, it did not allow for a user to access a point in the digital video represented by a delta frame, for that frame can only be reconstructed using the preceding delta frames and key frame. While some advanced video players were able to retrace the initial key frame and preceding delta frames to eventually reconstruct the desired frame, most digital video players were unable to reconstruct the desired video frame in a timely manner. Therefore, key frames were periodically inserted into the digital video data. Thus, when a user desired to access a point in the digital video represented by a delta frame, the decoder merely need look back to the last key frame to reconstruct the desired frame. Having these key frames inserted, for example, every fifth frame, allowed for a user to access the digital video from either the closest key frame or a delta frame with a relatively short reconstruction time.

Generally, most of today's digital video data is encoded in the latter format, with key frames inserted periodically to serve as marker points. Key frames contain a relatively high amount of data compared to delta frames. Accordingly, the latter encoding process, which contains multiple key frames, has a much lower compression rate and uses a much larger bandwidth than the original coding process which contained one key frame.

While the latter encoding process provides the ability to manipulate the starting point of the digital video, a greater compression rate is sometimes desirable in certain situations, even at the cost of this ability. For example, when an administrator wishes to broadcast digital video to one or multiple clients a minimal use of bandwidth is desired. Transmitting the digital video data encoded with frequent periodic key frames is not desirable when a minimal bandwidth is desired. Therefore, there is a need to compress digital video data encoded without frequent periodic key frames.

A system according to invention principles address these deficiencies and associated problems.

SUMMARY OF THE INVENTION

A system of compressing a video data stream includes a video data processor. The video data processor receives the video data stream. The processor then encodes key frames within the video data stream as both key frames and delta frames and encodes delta frames within the video data stream as delta frames. A broadcaster receives the encoded key and delta frames from the video processor and forms an encoded data stream from the key and delta frames. The broadcaster also receives a request signal from a client and transmits the encoded data stream including a first key frame positioned within the stream after receipt of the request signal and subsequent delta frames in response to the received request signal.

Standard compressed video data contains key frames and delta frames. In standard compressed video, key frames are inserted frequently to keep track of the position of the video data. These key frames act as markers, or starting points, for reconstructing the video when accessed from a random point. Delta frames are inserted to indicate the changes between the pre-encoded frames. However, when streaming video over a network, it is desirable to transmit to each client a minimal set of data to reduce the overall bandwidth used. Therefore, the encoder also encodes key frames positioned after the initial key frame as delta frames. The resulting stream is then transmitted whereby the first key frame after receipt of a request from a client is followed by subsequent delta frames. All subsequent key frames are removed from the transmitted stream. Upon receipt of a subsequent request for the transmitted stream, the first key frame in the stream after receipt of the request is inserted into the stream and is followed by a stream of delta frames until a subsequent request for the transmitted stream is received. Each time a new request for the stream is received from a client a new key frame is transmitted to that client. Otherwise, the stream includes only delta frames after the initial key frame. Though the bandwidth required to transmit the produced stream from the encoder to a broadcaster of the stream has increased, the bandwidth required to transmit the streams to the clients has decreased. In streaming servers this decrease in bandwidth is far greater then the former increase in bandwidth. Thus, the overall bandwidth is reduced as key frames are composed of a relatively large amount of data as compared with delta frames.

In a preferred embodiment a method is provided for producing a flexible stream of video data. Commonly encoded video data consists of a first key frame, delta frames and frequent periodic key frames. A first key frame is necessary to transmit the original opening picture. Subsequent delta frames are included to represent changes within the frames from the original key frame. The frequent periodic key frames, while useful in choosing arbitrary starting points in the digital video, are detrimental when seeking a high compression rate and low bandwidth. While removing the key frames and replacing them with representative delta frames may provide a higher compression rate, there is still a need to provide the stream data at arbitrary starting points. Therefore, the data stream is provided in a flexible format containing both encoded key frames as well as delta frames representative of the key frames.

This data stream is then distributed in accordance with client requests. Upon receipt of each client request the next key frame of the stream is distributed followed by a stream of delta frames. Subsequent key frames are not transmitted to any clients which have already received one key frame. This is especially useful when streaming common digital video content to a plurality of users, where both arbitrary stream start up and minimized bandwidth utilization are desired.

BRIEF DESCRIPTION OF THE DRAWING FIGURES

In order that the system may be more fully understood, it will now be described, by way of example, with reference to the accompanying drawing in which.

DETAILED DESCRIPTION OF THE INVENTION

Figure 1:
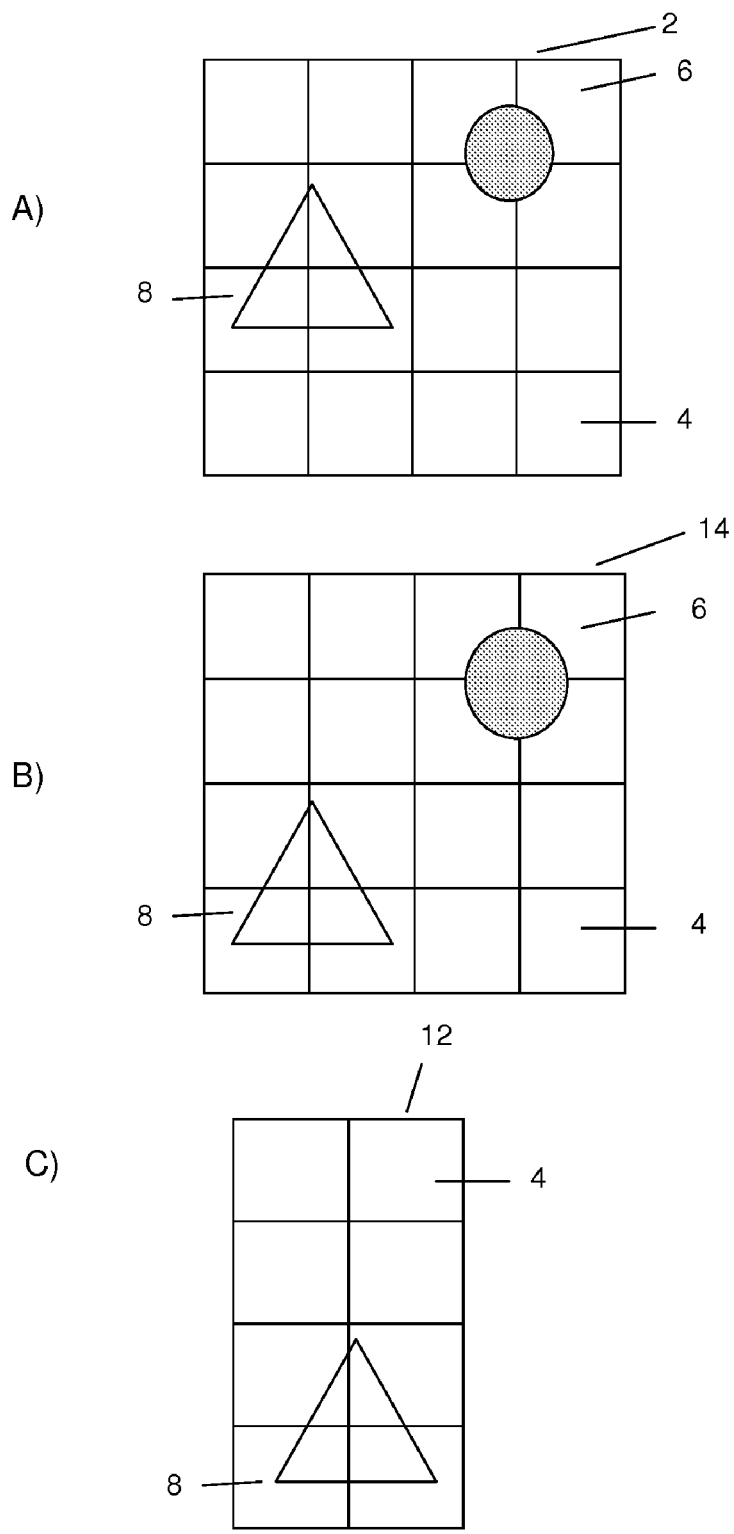
FIG. 1A is an illustrative view of an initial pre-encoded frame as commonly found in the prior art.
FIG. 1B is an illustrative view of an subsequent pre-encoded frame as commonly found in the prior art.
FIG. 1C is an illustrative view of delta frame as commonly found in the prior art.
Figure 2:
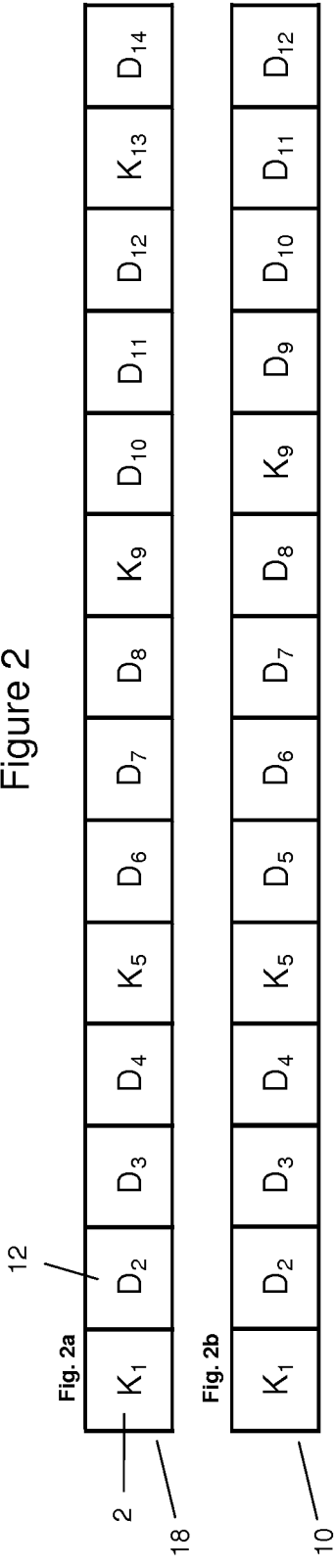
FIG. 2A is an illustrative view of the video data stream as commonly encoded in the prior art.
FIG. 2B is an illustrative view of the video data stream according to invention principles.
Figure 3:
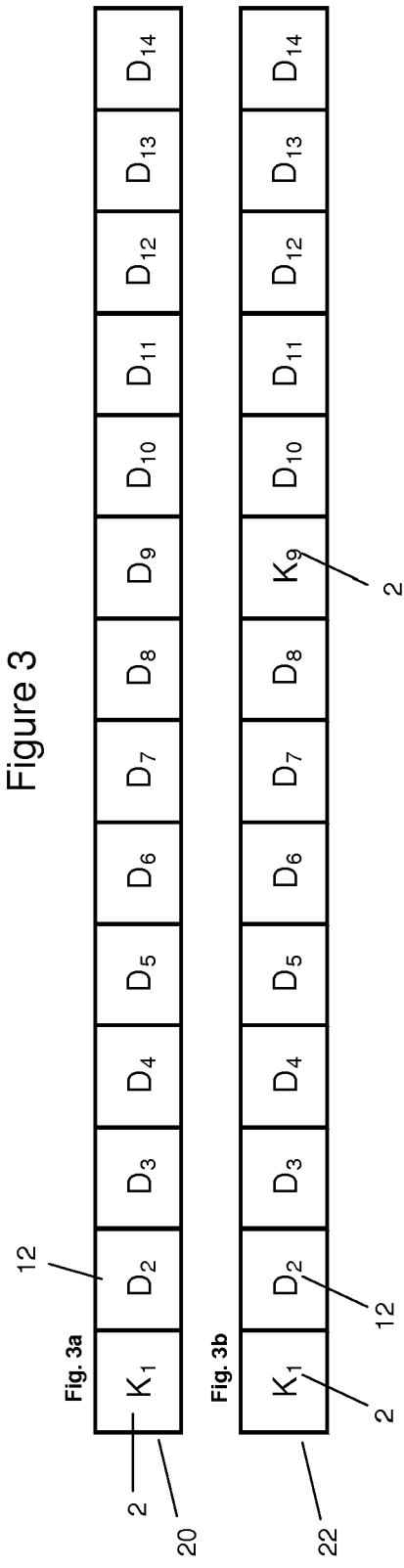
FIG. 3A is an illustrative view of the present video data stream as distributed in response to a single client request according to invention principles.
FIG. 3B is an illustrative view of the present video data stream as distributed in response to a second client request according to invention principles.

The operation of the system as described hereinbelow with respect to FIGS. 1-5 is accomplished via a plurality of processors. A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. As used herein a key frame is defined as a whole frame which the video player can use as a reference and start point. As used herein a delta frame is defined as a frame representing a change between a first frame and a subsequent frame. The decoding of the key frame and subsequent delta frame produces the pre-encoded subsequent frame.

FIG. 1A is an initial pre-encoded frame 2 in an existing system. Frame 2, and similar frames 14 and 12 of FIGS. 1B and 1C, is divided into regions 4 (typically 16×16 but illustrated as 4×4 for ease of illustration). A circular object 6 and a triangular object 8 appear in the initial pre-encoded frame 2.

FIG. 1B is a subsequent pre-encoded frame 14 in an existing system. Frame 14, similar to initial pre-encoded frame 2, contains the circular object 6 and the triangular object 8. In this subsequent frame 14, it can be seen that the triangular object 8 has moved from its position in the initial frame 2.

FIG. 1C is a delta frame 12 in an existing system. The delta frame 12 represents the difference between the initial pre-encoded frame 2 and the subsequent pre-encoded frame 14. Delta frame 12, similar to the initial pre-encoded frame 2 and the subsequent pre-encoded frame 14, contains the triangular object 8, presented in the position found within the subsequent frame 14.

The circular object 6 remains in a constant position through both frames 2 and 14. Accordingly, it would be redundant and a waste of size and bandwidth to encode the circular object 6, and the corresponding four regions 4 which it inhabits, for a second time in a second encoded frame. Therefore, the four regions 4 inhabited by circular object 6 are not encoded in delta frame 12. The triangular object 8 appears in four regions 4 in the initial pre-encoded frame 2. In the subsequent pre-encoded frame 14 the triangular object 4 has moved down two regions 4 and appears in two similar regions and two different regions from its position in the initial frame 2. Thus, a change has taken place in a total of six regions 4 between pre-encoded frames 2 and 14. These six affected regions 4 of the subsequent pre-encoded frame 14 are encoded into delta frame 12. The remaining regions 4 of the subsequent pre-encoded frame 14, similarly to the regions containing circular object 6, are not encoded in the delta frame 12 as no change has taken place within these frames. Delta frame 12 is a visual representation of the difference between pre-encoded initial frame 2 and subsequent frame 14. By using this encoding process a minimum set of data, i.e. the change between frames 2 and 14, is required to be encoded, thereby reducing size and bandwidth needed to transmit.

In MPEG encoding key frame 2 is known as an inter-frame and delta frame 12 is known as a bi-directional frame or a predictive frame.

FIG. 2A is an illustrative view of the Video Data Stream. The key frames 2 and delta frames 12 described in FIG. 1 are encoded into a digital video stream 18. Encoded digital video stream 18 contains frequent periodic key frames 2. The key frames 2 are periodically placed between delta frames 12 to allow a user to access the video stream 18 from a desired start point. When a user desires to view a transmission at a point for which the data is encoded as a delta frame 12, the viewer is either directed to the closest key frame 2 or constructs the desired start frame from the previous key frame 2 and subsequent delta frames 12.

While this feature may provide a higher quality viewing experience the compression rate is low. A higher data compression rate is desired in multiple situations, particularly streaming video. Therefore, the system provides the video data stream 18 in a format which duplicaties key frames as both key frames 2 and delta frames 12. As such, the transmission of the multimedia stream is tailored to minimize the bandwidth utilization of the client to which the stream is transmitted. FIG. 2B is an illustrative view of the video data stream 10 according to invention principles. To provide the flexibility of distributing the video data stream with a single key frame 2 per client request (as will be described in greater detail in reference to FIGS. 3A and 3B) each key frame is also encoded as a delta frame and the delta frame 12 is introduced into the stream 10 following each key frame. The introduced delta frame 12 is representative of the data enclosed within the previous key frame 2. In the system, the first key frame 2 of the video data stream 10 need not be duplicated as a delta frame 12 for client access cannot begin before that point, thus calling for a filtering of key frames 2.

FIG. 3A is an illustrative view of the video data stream of the system as distributed in response to a single client request. A single key frame 2 is required for a client to decode a received video data stream. Therefore, when a single client request is received, as illustrated in FIG. 3A, a single key frame 2 is provided followed by subsequent delta frames 12. The subsequent key frames 2 are filtered and discarded, as the client does not require the transmission of these additional key frames 2. In multiple cases, a second client may wish to view the streaming digital video broadcast 10, illustrated in FIG. 2B, thereby requesting the broadcast at a later starting point than the first client request illustrated in FIG. 3A.

FIG. 3B is an illustrative view of the video data stream 22 of the system as distributed in response to a second client request. When an additional request is received for the digital video stream 10, a second key frame 2 is provided from the data stream 10 as displayed in digital video stream 22. This second encoded key frame 2 allows for the second user's media player to receive a video data stream, similar to the video data stream 20 received by a single client in FIG. 3A, which includes a single key frame 2 and subsequent delta frames 12. The first client will thus receive two key frames 2 in total followed by subsequent delta frames 12. Any subsequent key frames 2 after the last client request are filtered and discarded, as the clients do not require the transmission of these additional key frames 2. In this way, by transmitting a single key frame for each client request, a minimal set of video data is transmitted across the network, thus lowering the required bandwidth.

Figure 4:
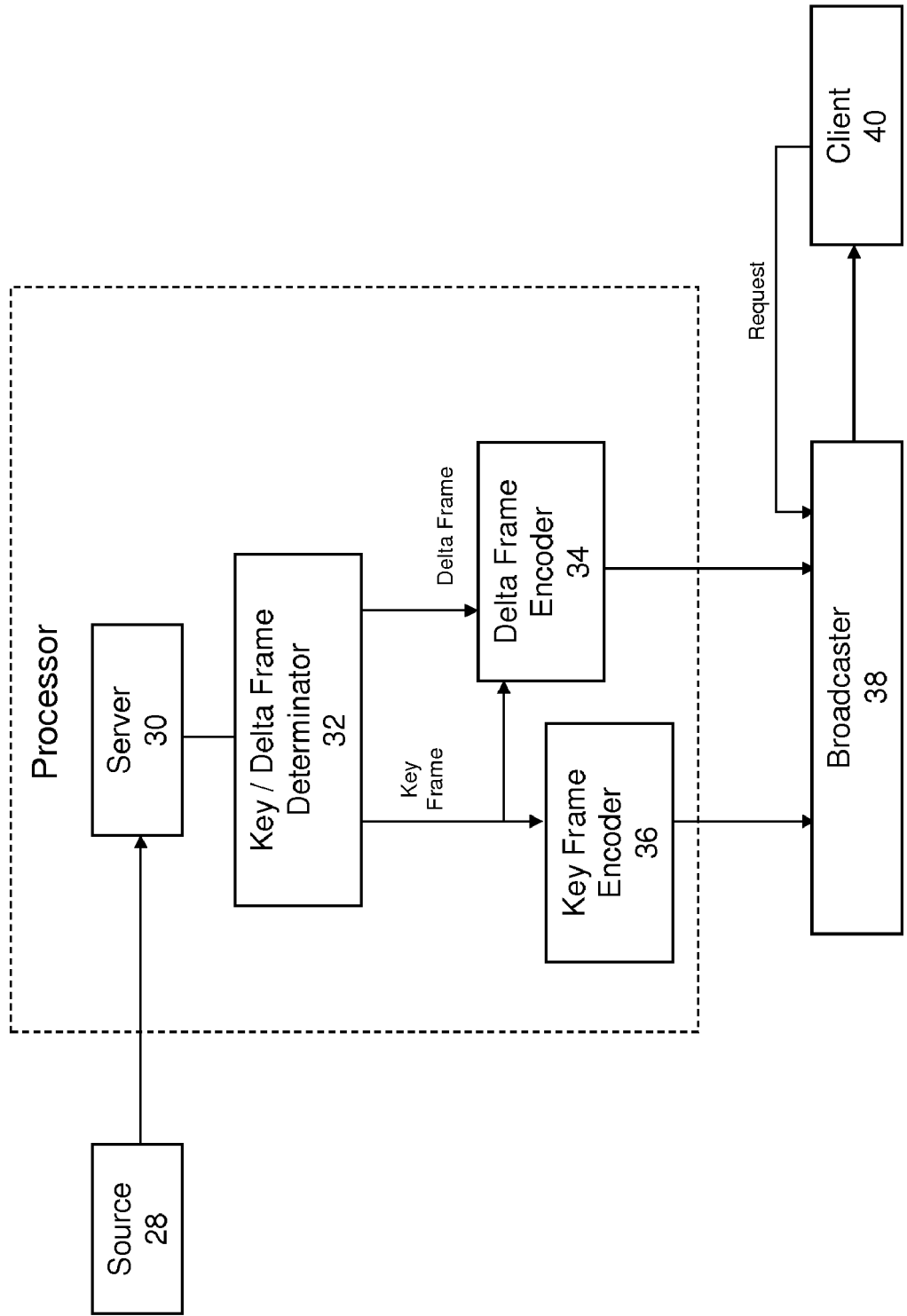
FIG. 4 is a block diagram of the encoder and distributor of the present system according to invention principles.

FIG. 4 is a block diagram of the system according to invention principles. The streaming server 30 receives a video data stream from video source 28. In providing the video data in the system format, the server 30 begins by sending a signal to a key/delta frame determinator 32. The key/delta frame determinator determines if the received video data is either a key frame or a delta frame by analyzing the quantity and structure of the data in the received video data. If the video data is a key frame, the key/delta frame determinator 32 forwards the key frame to both a key frame encoder 36 and a delta frame encoder 34. Delta frame encoder 40 converts the received key frame into a corresponding delta frame. The conversion may be accomplished by constructing the preceding frame and encoding the difference between the current frame and the previous frame (as shown in FIGS. 1A-1C). The key frame encoder encodes the key frame. If key frame/delta frame determinator 32 determines that the received video data is a delta frame, the delta frame is forwarded to delta frame encoder 34. The encoded key and delta frames are forwarded by the key frame encoder 36 and delta frame encoder 34, respectively, to a broadcaster 38 which generates the data stream as depicted in FIG. 2B. Upon receipt of a request signal from a client 40, the broadcaster 38 will detect the first key frame after receipt of the request signal and transmit the key frame and subsequent delta frames to the client 40. The broadcaster will continue to transmit the stream without any subsequent key frames until a request for the video stream is received from another client. At that time, the next key frame in the stream is inserted into the transmitted stream and the broadcaster continues to transmit the stream of delta frames without any subsequent key frames. Each time a new request for the video stream is received, the broadcaster 38 will insert the next key frame and then continue to transmit all delta frames. Subsequent key frames will only be transmitted immediately after receipt of a request signal from a client otherwise, the data stream will consist of delta frames.

Figure 5:
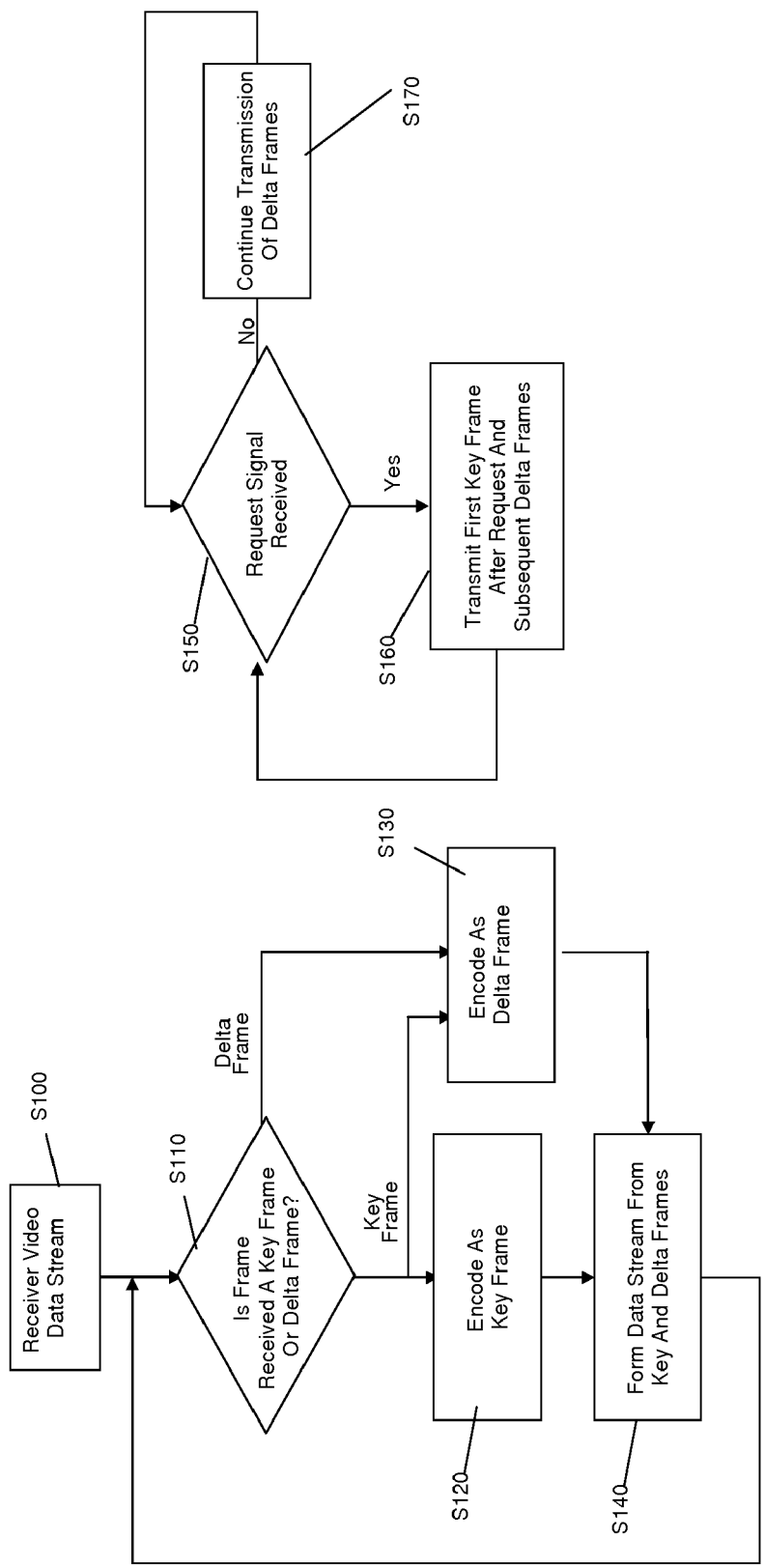
FIG. 5 is a flowchart of the operations of the encoder and distributor of the present system according to invention principles.

FIG. 5 is a flowchart of the operation of the system. The process begins upon the receipt of a video data stream as indicated in step S100. The video data is analyzed for the structure and quantity of data to determine if the data is either a key frame or a delta frame in step S110. If the video data received is a key frame, the key frame is encoded as both a key frame and a delta frame as indicated in steps S120 and S130. If the video data received is determined to be a delta frame in step S110 then the delta frame is encoded in step S130. The encoded key and delta frames are then combined to form a data stream in step S140. A check is performed to determine if a request signal is received from a client requesting access to the data stream in step S150. If a request signal has been received, the first key frame in the data stream after the receipt of the request signal is transmitted and the subsequent delta frames are transmitted for receipt by the client as described in step S160. The system will then continue to check for a subsequent request signal from another client in step S150. When a subsequent request signal is received, the system will transmit the next key frame within the data stream and then continue to transmit subsequent delta frames. The system will then continue to check for subsequent request signals and repeat step S160 if a subsequent request is received from another client. If no subsequent request signals are received, the system will continue to transmit delta frames as discussed in step S170. The system will then continue to check for any subsequent request signals in step S150.

What is claimed:

1. A method of compressing a video data stream comprising a plurality of frames with at least one frame designated as a key frame and at least one other frame designated as a delta frame, said method comprising the activities of:
   receiving the video data stream;
   detecting if a received frame is a key or delta frame;
   encoding delta frames as delta frames;
   encoding each key frame in its entirety as both a key frame and a delta frame;
   forming an encoded video data stream including the encoded key and delta frames;
   receiving a request signal for the encoded video data stream; and
   transmitting a portion of the encoded video data stream including a first encoded key frame positioned within the encoded video data stream after receipt of the request signal and encoded delta frames subsequent to said first encoded key frame.

2. The method of compressing video of claim 1, further comprising the activities of:
   receiving a subsequent request signal for the encoded video data stream;
   inserting a next encoded key frame within the stream after receipt of the subsequent request signal; and
   transmitting another portion of the encoded video data stream including the next encoded key frame and encoded delta frames subsequent to the next encoded key frame.

3. The method of compressing video data of claim 2, wherein said activities of inserting a next encoded key frame and transmitting another portion of the encoded video data stream are repeated upon receipt of any further request signals.

4. The method of claim 3, wherein the activity of repeating does not transmit the next encoded key frame to a client other than a client from which a subsequent request signal is received.

5. A system of compressing a video data stream comprising a plurality of frames with at least one frame designated as a key frame and at least one other frame designated as a delta frame, said system comprising:
   a video data processor for,
      receiving the video data stream;
      encoding each key frame within the video data stream in its entirety as both a key frame and a delta flame; and
      encoding delta frames within the video data stream as delta frames; and
   a broadcaster for, receiving the encoded key and delta frames from the video processor;

forming an encoded video data stream from the encoded key and delta frames;

receiving a request signal from a client; and transmitting a portion of the encoded video data stream including a first encoded key frame positioned within the encoded video data stream after receipt of the request signal and encoded delta frames subsequent to said first encoded key frame.

6. The system of claim 5, wherein the broadcaster transmits encoded key frames within the encoded video data stream immediately after receipt of a subsequent request signal from a client.

7. The system of claim 6, wherein encoded key frames transmitted immediately after receipt of the subsequent request signal are not transmitted to clients other than the client sending the request signal.

8. The system of claim 5, wherein the video data processor includes:

a determinator for determining if a frame within the received video stream is a key frame or a delta frame.

9. The system of claim 5, wherein the video data processor includes:

a key frame encoder for encoding key frames within the video data stream.

10. The system of claim 5, wherein the video data processor includes:

a delta frame encoder for encoding both key and delta frames within the received video data stream as delta frames.

11. A method of forming an encoded data stream comprising a plurality of frames with at least one frame designated as a key frame and at least one other frame designated as a delta frame, said method comprising the activities of:

determining if video data is a key frame or delta frame;

encoding frames determined to be delta frames as delta frames;

encoding in its entirety each frame determined to be a key frame as both a key frame and a delta frame;

forming the encoded data stream from the encoded key and delta frames, whereby each key frame encoded as a delta frame is positioned adjacent to its corresponding encoded key frame in the encoded data stream.

12. The method of claim 11, further comprising the activity of:

transmitting a portion of the encoded data stream including a first encoded key frame positioned in the encoded data stream after receipt of a request for the encoded data stream and all encoded delta frames subsequent to said first encoded key frame.

13. The method of claim 12, further comprising the activity of:

transmitting a second encoded key frame positioned within the encoded data stream after receipt of a subsequent request for the encoded data stream to a client from which the subsequent request for the data stream was received.

14. The method of claim 13, wherein the second encoded key frame positioned within the encoded data stream after receipt of said subsequent request for the encoded data stream is not transmitted to clients other than the client from which the subsequent request for the encoded data stream was received.

* * * * *